United States Patent
Pepe et al.

[15] 3,684,793
[45] Aug. 15, 1972

[54] ROOM TEMPERATURE CURING ORGANOPOLYSILOXANES

[72] Inventors: Anthony Enrico Pepe, Wilton, Conn.; Guenther Fritz Lengnick, Manitou Beach; Charles George Neuroth, Blissfield, both of Mich.

[73] Assignee: Stauffer-Wacker Silicone Corporation, Adrian, Mich.

[22] Filed: April 10, 1970

[21] Appl. No.: 27,454

Related U.S. Application Data

[63] Continuation-in-part of Ser. No. 688,336, Dec. 6, 1967, abandoned.

[52] U.S. Cl. ..........260/18 S, 117/123 D, 117/124 F, 117/135.1, 117/148, 260/33.6 SB, 260/33.8 SB, 260/37 SB, 260/46.5 E, 260/46.5 G, 260/46.5 P
[51] Int. Cl. .............................................C08f 19/14
[58] Field of Search ........260/46.5 E, 46.5 G, 46.5 P, 260/18 S

[56] References Cited

UNITED STATES PATENTS

| | | | |
|---|---|---|---|
| 3,109,013 | 10/1963 | Haluska | 260/448.2 |
| 3,109,826 | 11/1963 | Smith | 260/18 |
| 3,429,847 | 2/1969 | Boiessieras et al. | 260/37 |
| 3,477,973 | 11/1969 | Lengnick et al. | 260/18 |
| 3,032,528 | 5/1962 | Nitzsche et al. | 260/46.5 |
| 3,441,537 | 4/1969 | Lengnick | 260/46.5 |
| 3,565,851 | 2/1971 | Neuroth | 260/37 |
| 3,467,826 | 11/1969 | Millen | 260/824 |

*Primary Examiner*—Donald E. Czaja
*Assistant Examiner*—M. I. Marquis
*Attorney*—Marion D. Ford

[57] ABSTRACT

The invention relates to curable organopolysiloxane compositions comprising an organopolysiloxane and a disilaorganic cross-linking agent containing functional groups which are hydrolyzable in the presence of ambient moisture.

5 Claims, No Drawings

ROOM TEMPERATURE CURING ORGANOPOLYSILOXANES

This application is a continuation-in-part of application Ser. No. 688,336, filed Dec. 6, 1967, now abandoned.

This invention relates to organopolysiloxanes, particularly organopolysiloxane compositions which are curable at room temperature and more particularly to organopolysiloxane compositions containing novel cross-linking agents and to a method for preparing the same.

Heretofore, it was known that certain fluid organopolysiloxanes when exposed to atmospheric moisture at room temperature are converted to an elastomeric state. The desirability of room temperature curing systems is well known; however, the conventional room temperature curing systems involve two or more stable components which, when mixed together, rapidly cure to a solid workable state. In other words, the end-user was provided with a two-package system in which one component had to be added just prior to use. Although the two-package is adequate for many applications, there are other applications where the two-package system is not desirable because of the lack of skill of the workmen or because of equipment which is inadequate to carry out the necessary mixing operation.

Consequently, there was a need in the silicone industry for a one-package room temperature curing system which was provided by the introduction of linear polysiloxanes having terminal hydrolyzable functional groups. While these single component room temperature curing compositions have met with commercial success, it has been extremely difficult to adapt them to some circumstances where extended working time is necessary or desirable. Also, in some commercial applications, it is desirable to provide an organopolysiloxane elastomer which is resistant to compression, has greater solvent resistance, improved cross-linking and improved hardness. Heretofore, none of the organopolysiloxanes commercially available provide all of these desirable properties.

It is therefore an object of this invention to provide an organopolysiloxane which is curable at room temperature. Another object of this invention is to provide compositions which vary in working time without reducing the cross-linking ability of the polymers employed. Still another object of this invention is to provide a curable organopolysiloxane having improved physical properties. A further object of this invention is to provide novel cross-linking agents which will react with hydroxyl-terminated organopolysiloxanes to form an elastomeric material. A still further object of this invention is to provide an organopolysiloxane composition which may be dispensed in a single package.

The foregoing objects and others which will become apparent from the following description are accomplished in accordance with this invention, generally speaking, by providing curable compositions of the general formula:

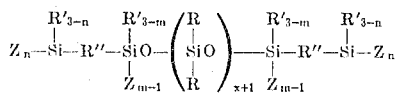

in which the R(s) which may be the same or different represent monovalent hydrocarbon radicals, halogenated monovalent hydrocarbon radicals or cyanoalkyl radicals; R' represents monovalent hydrocarbon radicals, halogenated monovalent hydrocarbon radicals, cyanoalkyl radicals or hydrogen; R'' is a divalent hydrocarbon radical or a halogenated divalent hydrocarbon radical; Z is a radical hydrolyzable by ambient moisture; $m$ is an integer of at least 1, $n$ is an integer of from 0 to 3 and the sum of $m$ and $n$ is greater than 2 and when Z is an acyloxy radical, $m$ is equal to at least 2 and $n$ is at least 1 and when Z is an aminooxy radical and m is equal to at least 1, then $n$ is greater than 2; and when $n$ is zero then $m$ is greater than 2; $x$ is an integer of from 0 to 20,000 and $y$ is an integer of from 1 to 500.

The organopolysiloxanes of this invention are prepared by reacting disilaalkanes or -arenes of the formula:

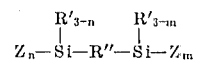

with an organopolysiloxane of the formula:

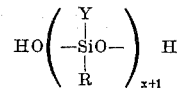

wherein R, R', R'', Z, $m$, $n$, and $x$ are the same as those represented above. R and R' are organic radicals selected from the class consisting of alkyl radicals having from 1 to 18 carbon atoms such as methyl, ethyl, propyl, butyl, hexyl, octyl, decyl, dodecyl, tetradecyl, octadecyl; aryl radicals such as phenyl, diphenyl, naphthyl, and the like; alkaryl radicals such as tolyl, xylyl, ethylphenyl and the like; aralkyl radicals such as benzyl, phenylethyl and the like; haloaryl radicals such as chlorophenyl, tetrachlorophenyl, difluorophenyl and the like; alkenyl radicals such as vinyl, allyl and the like; R'' are divalent hydrocarbon or halogenated hydrocarbon radicals having from two to 18 carbon atoms such as methylene, ethylene, propylene, tetramethylene, hexamethylene, octamethylene, decamethylene, phenylene, phenylethylene, diphenylmethylene and the like. Z represents groups which are hydrolyzable by ambient moisture such as:

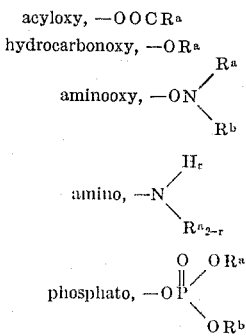

radicals wherein $R^a$ and $R^b$ which may be the same or different represent monovalent hydrocarbon radicals and halogenated monovalent hydrocarbon radicals and r is a number of from 1 to 2. Examples of acyloxy groups are monoacyl radicals of carboxylic acids such as formyloxy, acetoxy, propionyloxy, valeryloxy, caproyloxy, myristoyloxy and stearoyloxy radicals; hydrocarbonoxy groups having from one to 10 carbon atoms such as methoxy, ethoxy, butoxy, heptoxy, octoxy, decoxy, phenoxy and the like; aminooxy groups such as dimethylaminooxy, diethylaminooxy, dipropylaminooxy, dibutylaminooxy, dioctylaminooxy, diphenylaminooxy, ethylmethylaminooxy, methylphenylaminooxy and the like. Other hydrolyzable groups are amino, methyl amino, ethyl amino, propyl amino, butyl amino, hexylamino, phenylamino and the like. Examples of suitable phosphato radicals are dimethylphosphato, diethylphosphato, dipropylphosphato, dibutylphosphato, dihexylphosphato, dioctylphosphato, didodecylphosphato, dioctadecylphosphato, methylethylphosphato, ethylpropylphosphato, methylhexylphosphato, butylhexylphosphato, methyldodecylphosphato, methyloctadecylphosphato, ethyltetradecylphosphato, diphenylphosphato, methylphenylphosphato, butylphenylphosphato and the like.

The cross-linking agents of this invention have functional groups which are hydrolyzable by ambient moisture and may be prepared by reacting unsaturated hydrocarbon or unsaturated halogenated hydrocarbon groups with a silane or a halosilane to form the corresponding halodisilaalkanes or -arenes having halogen groups linked to the silicon atoms.

The disilaorganic compounds contemplated in this invention may be represented by the following general formula:

$$\begin{matrix} R' & & X \\ R'-Si-R''-Si-X \\ R' & & X \end{matrix} \text{ or } \begin{matrix} X & & X \\ R'-Si-R''-Si-R \\ X & & X \end{matrix} \text{ or } \begin{matrix} X & & X \\ R'-Si-R''-Si-X \\ X & & X \end{matrix}$$

wherein R' and R'' are the same as those described above and X is a halogen. These compounds may be reacted with compounds containing hydrolyzable groups to provide a composition which is curable in the presence of ambient moisture. For example, the reaction of 3,3-dichloro-3-silabutene-1 with trichlorosilane in the presence of a catalyst such as chloroplatinic acid, organic peroxides, metal carbonyls and the like which promote the addition of the silane moiety to an olefinic double bond forms 1,1,1,4,4-pentachloro-1,4-disilapentane in accordance with the following equation:

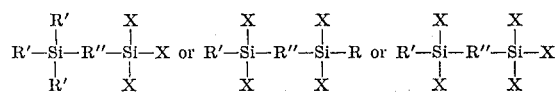

Reaction of the above pentachlorodisilapentane with an anhydride, e.g., acetic anhydride, results in the substitution of acetoxy groups for the chlorine atoms which are hydrolyzable with ambient moisture.

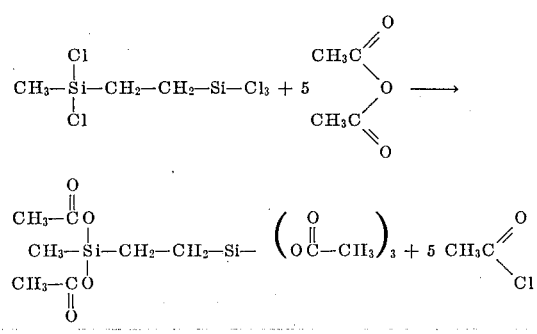

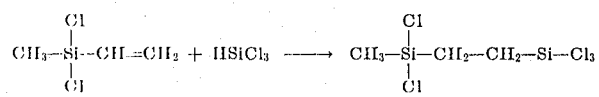

In preparing dislaalkanes or disilaarenes having acyloxy functional groups, the halogen containing disilaorganic compounds are reacted with organic acids or anhydrides thereof at a temperature of from about 25° to about 150° C., preferably from about 50° to 120° C. and if desired in the presence of a solvent. Suitable solvents include aliphatic hydrocarbons such as pentane, hexane, heptane, octane; aromatic hydrocarbons such as benzene, toluene, xylene, naphthylene as well as halogenated solvents such as methylene chloride, chlorobenzene and the like. Other solvents which may be used are organic ethers such as petroleum ether, diethyl ether, dibutyl ether and hydroxyl-free fluid siloxanes.

In the formation of aminooxydisilaalkanes or -arenes an organohydroxylamine is reacted with a halogen containing disilaorganic compound, preferably in the presence of an inert solvent such as chloroform, benzene, toluene, xylene, perchloroethylene, etc. at a temperature of from about 50° to 60° C. to form the corresponding aminooxydisilaorganic compound. Generally, the reaction is completed in a matter of from about 1 to 2 hours.

Disilaorganic compounds having phosphato functional groups may be prepared by reacting halogen containing disilaorganic compounds with phosphoric acid or an alkali metal or alkaline earth metal salt of an organic phosphate and if desired, in the presence of an inert solvent.

Likewise these halogen-containing disilaorganic compounds may be reacted with amines or carbonoxy containing compounds to provide a composition which is curable in the presence of atmospheric moisture.

The conventional organopolysiloxanes described heretofore may be prepared from difunctional organosilanes of the formula:

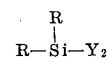

wherein the R(s) which may be the same or different represent halogenated or unhalogenated monovalent aliphatic, alicyclic or aromatic hydrocarbon radicals such as methyl, ethyl, vinyl, allyl, cyclohexyl, cyclohexenyl, phenyl and totyl and Y represents a hydrolyzable atom or group such as halogen atoms or alkoxy groups. The diorganopolysiloxanes may be homopolymers as well as copolymers, that is, compounds derived from two or more different diorganosilanes and even the organic radicals linked to any particular silicon atom may be different organic radicals. Especially useful are the dimethylpolysiloxanes, methylphenylpolysiloxanes and the methylvinylpolysiloxanes.

The curable organopolysiloxane compositions of this invention may be prepared by reacting the disilaalkanes or -arenes containing hydrolyzable groups at ambient moisture with the organopolysiloxanes at any convenient temperature. Although, in general, temperature ranging from about 20° to 100° C. are sufficient. It should be understood, of course, that higher or lower temperatures may be employed if desired although, preferably the reaction should be carried out at temperatures below about 200° C.

If desired, the reaction may be carried out in the presence of an inert solvent which is unreactive with both the terminal hydroxyl groups on the organopolysiloxane or the functional groups on the disilaalkanes or disilaarenes. Solvents which may be used include hydrocarbons such as benxene, toluene, xylene; halogenated solvents such as ethylene chloride, perchloroethylene, chlorobenzene and the like; organic ethers such as diethyl ether, dibutyl ether and hydroxyl free fluid siloxanes. The presence of solvents are particularly desirable when the hydroxyl-terminated organopolysiloxane has a high viscosity. In these cases, the presence of a solvent reduces the overall viscosity of the mixture and facilitates the reaction.

The ratio of the disilaorganic cross-linking agent to the organopolysiloxane is not critical; however, it is preferred that at least 1 mole of the disilaorganic cross-linking agent be used per mole of silicon bonded hydroxyl group and more preferably from about 2 to 5 moles of the disilaorganic cross-linking agent be used per mole of silicon bonded hydroxyl group in the organopolysiloxane. It is possible to use up to about 12 moles of the disilaorganic cross-linking agent per mole of silicon bonded hydroxyl group in the siloxane. A large excess of the cross-linking agent containing functional groups insures complete reaction with all silicon bonded hydroxyl groups and in addition, acts as a scavenger for any moisture which may be present. It is preferred that the reaction be carried out in the absence of moisture since the latter may interfere with the reaction. However, traces of moisture are not especially harmful if an excess of the disilaorganic cross-linking agent is used.

The compositions of this invention may be cured by merely exposing them to atmospheric moisture with or without any additional water vapor. Upon exposure to moisture, the compositions cure in times from a few minutes to several hours or days depending upon the type of groups present. In general, an increase in the molecular weight of any of the groups will increase the time of the cure.

Where it is desirable to modify the consistency of the uncured composition or to reinforce the cured products or for some other purpose, mineral fillers in the form of very fine powders may be incorporated therein.

Examples of mineral fillers which may be used are various kinds of silicas, oxides of iron, zinc, cadmium, aluminum and carbonates. The particular filler and proportion in which it is used will depend to a certain extent on the particular use to which the composition is to be applied. Silica obtained by precipitation, for example, those sold under the tradenames SANTOCEL and HI-SIL and silicas obtained from combustion such as sold under the tradename AEROSIL, are particularly suitable for the production of reinforced elastomeric products. These silicas are micro-fine products having a large absorptive surface and are very effective even in small quantities. Fillers such as milled natural silicas and calcium carbonate can, on the other hand, be employed in large proportions, for example, 100 percent based on the weight of the organopolysiloxane.

Apart from the fillers mentioned heretofore, compositions conforming to the invention may contain coloring agents, thixotropic agents, agents capable of preventing the passage of ultraviolet light, desiccants and antioxidants.

These compositions may be dissolved or dispersed in organic diluents which are compatible with the organopolysiloxanes. Examples of suitable diluents are aromatic hydrocarbons such as benzene, toluene or xylene; aliphatic hydrocarbons such as hexane and heptane and halogenated aliphatic hydrocarbons such as methylene chloride and the like.

In addition to the constituents mentioned above, the compositions of this invention may contain for the purpose of accelerating the curing rate, certain compounds which have a catalytic effect on the condensation reactions. Although several compounds are known to have a catalytic effect on the curing rate, organotin compounds were found to be the most desirable. Examples of suitable catalysts are the tin salts of organic acids such as tin naphthenate, tin-2-ethylhexanoate, tin benzoate, dibutyltin dilaurate, dibutyltin diacetate, bis(dibutyltin oleate) oxide, bis(dibutyltin stearate) oxide, dibutyltin oleate hydroxide and the like. These tin compounds may be used in an amount determined as tin metal of from 0.001 to about 1 percent by weight based on the weight of the organopolysiloxanes.

It is preferred that a catalyst, particularly a tin salt of an organic acid be incorporated in curable organopolysiloxane compositions containing oximo functional groups in order to obtain a satisfactory curing rate when exposed to ambient moisture. As mentioned previously, the catalyst may be used in compositions containing other functional groups where it is desirable to increase cure rate for a specific application.

The compositions of this invention may be prepared by mixing liquid hydroxyl-terminated organopolysiloxanes and a filler in any conventional mixing apparatus such as Sigma Blade Mixer, roller mill, Banbury Mixer and the like; and thereafter heating the mixture for a sufficient time to eliminate all traces of moisture. The mass is then cooled and the disilaorganic cross-linking agent containing functional groups is added and if desired, a catalyst and an anhydrous organic diluent. The composition may be used immediately or it may be transferred under anhydrous conditions to dry containers which are then hermetically sealed. The products thus prepared may be kept for several months and even years.

These compositions are stable in the absence of moisture, consequently they may be stored for prolonged periods of time with little or no change occurring in the physical properties of the composition. This is of particular importance from a commercial standpoint since it assures that once a composition is prepared having a certain consistency and cure time that neither will change to any great extent upon storage. This stability on storage is a characteristic which makes the composition of this invention particularly useful as a one-component room temperature curing compositions.

Also, the disilaorganic compounds, especially those having at least four acyloxy groups linked to the molecule, may be used as primers on metal, wood, glass, ceramic and masonry substrates for room temperature curing one- and two-component grafted and ungrafted organopolysiloxanes. The primer may be applied by brushing, spraying or dipping by itself or in solution. Where it is applied as a solvent solution, it is preferred that the solvent portion be not greater than about 25 percent by weight of the primer composition.

The drying rate of the primer is primarily dependent on two factors. One factor is the rate of condensation of the disilaorganic compound or partial hydrolyzates thereof which is dependent first, on the size of the R' and acyloxy radicals and second, on the amount of water present for hydrolysis of the acyloxy radicals to volatile acids. Where R' and the acyloxy radicals are large, the rate of hydrolysis and condensation of the disilaorganic compound is very slow. Where the disilaorganic compound is exposed to water as, for example, in the form of steam, hydrolysis and condensation are accelerated.

The other factor is the presence or absence of solvent. If a solvent is employed, the volatility of the solvent affects the drying rate of the primer, therefore, it is desirable that any solvent employed be sufficiently volatile to evaporize under coating conditions at least as rapidly as the disilaorganic compound can hydrolyze and condense.

The curable organopolysiloxanes of this invention adhere to a variety of materials such as, for example, wood, metal, glass, ceramics, plastics and the like. In the case of metals, it may be desirable to apply an appropriate pre-treatment to the metal before applying the composition of this invention. These self-curing compositions may serve for caulking, covering various articles such as electrical equipment, coating glass, metals, fabrics, protecting various supports and producing films and molded articles. These compositions may be applied by any of the usual techniques such as dipping, doctoring or spraying.

Various aspects of the invention are further illustrated by the following examples which are not to be taken as in any way limiting the scope thereof. In the examples, all parts are by weight unless otherwise specified.

EXAMPLE 1

To a reactor fitted with a mechanical stirrer, reflux condenser, nitrogen inlet and addition funnel are added about 295 parts of 1,1,1,4,4-pentachloro-1,4-disilapentane in about 500 parts of benzene.

To this mixture are added with agitation over a 30 minute period about 600 parts of acetic anhydride in about 300 parts of benzene. The reaction mass is refluxed for about 45 minutes at a temperature of about 80° C. The volatile materials are removed in vacuo and a product identified as 1,1,1,4,4-penta-acetoxy-1,4-disilapentane is recovered.

Approximately 3 parts of the above prepared penta-acetoxydisilapentane are reacted with about 50 parts of a hydroxyl-terminated polysiloxane fluid (2,000 cs.) at 60° C. with agitation for about 0.5 hours in the absence of moisture. The volatile materials are removed by vacuum distillation and the residual product placed in a mold and allowed to cure at room temperature. It cured to a tack-free condition in less than about 2 hours.

EXAMPLE 2

To a reactor fitted with a mechanical agitator, reflux condenser, nitrogen inlet and an addition funnel are added about 384 parts of 2,2,5,5-tetrachloro-2,5-disilahexane in about 400 parts of benzene. About 642 parts of acetic anhydride in about 400 parts of benzene are added dropwise through the addition funnel. The reaction mass is refluxed at a temperature between 90° and 102° C. for about 2 hours. The volatile materials are removed under vacuum yielding a product identified as 2,2,5,5-tetra-acetoxy-2,5-disilahexane.

To about 100 parts of a hydroxyl-terminated polydimethylsiloxane (2,000 cs.) are added with mixing in the absence of moisture about 15 parts of Cab-O-Sil and about 15 parts of the tetra-acetoxydisilahexane prepared above. After mixing for about one-half hour, the volatile materials are removed under vacuum and the residual product transferred to a mold and allowed to cure at room temperature. The product cured to a tack-free condition in about 1.5 hours.

EXAMPLE 3

In accordance with the procedure described in Example 2, about 400 parts of acetic anhydride in about 300 parts of benzene are added to a reactor containing about 312 parts of 2,2,7,7-tetra-chloro-2,7-disilaoctane in about 500 parts of benzene. The reaction mass is refluxed at about 100° C. for about 2 hours. The volatile materials are then removed under vacuum yielding a product identified as 2,2,7,7-tetra-acetoxy-2,7-disilaoctane.

EXAMPLE 4

In accordance with the procedure described in Example 2, approximately 490 parts of acetic anhydride are added dropwise to a reactor containing about 424 parts of 2,2,11,11-tetrachloro-2,11-disiladodecane. The reaction mass is refluxed for a period of about 2.5 hours and the volatile materials are then removed under vacuum. A product is recovered which is identified as 2,2,11,11-tetra-acetoxy-2,11-disiladodecane.

EXAMPLE 5

In accordance with the procedure described in Example 2, approximately 1,158 parts of decanoic acid are added dropwise to a reactor containing 312 parts of 2,2,7,7-tetrachloro-,7-disilaoctane. The reaction mass is refluxed for a period of about 3 hours and the volatile materials are then removed under vacuum. A residual product is recovered which is identified as 2,2,7,7-tetra-decanoyloxy-2,7-disilaoctane.

EXAMPLE 6

In accordance with the procedure described in Example 1, approximately 731 parts of N,N-diethylhydroxylamine dissolved in about 170 parts of dry heptane are added to a reactor containing 235 parts of 1,1,1-trichloro-4,4-dimethyl-1,4-disilapentane in about 250 parts of dry heptane and heated to reflux temperature for about 1 hour. A precipitate is formed which is removed by filtration and identified as N,N-diethylhydroxylamine hydrochloride. The heptane solvent and excess N,N-diethylhydroxylamine are removed in vacuo yielding a residual product which is identified as 1,1,1-tris(N,N-diethylaminooxy)-4,4-dimethyl-1,4-disilapentane.

EXAMPLE 7

Approximately 157 parts of N,N-dioctylhydroxylamine in about 410 parts of dry heptane are added to a reactor containing about 58 parts of 1,1,1-trichloro-4,4-dimethyl-1,4-disilapentane in about 110 parts of dry heptane. The reaction mass is heated to reflux temperature for about 1 hour. After cooling to room temperature, a precipitate identified as N,N-dioctylhydroxylamine hydrochloride is removed by filtration and the heptane solvent and excess N,N-dioctylhydroxylamine is removed in vacuo. A residual product is recovered which is identified as 1,1,1-tris(N,N-dioctylaminooxy)-4,4-dimethyl-1,4-disilapentane.

EXAMPLE 8

In accordance with the procedure described in Example 7, approximately 87 parts of 1,1,1-trichloro-12,12-dimethyl-1,12-disilatridecane in about 200 parts of dry heptane are reacted with about 150 parts of N,N-diethylhydroxylamine. The product is recovered which is identified as 1,1,1-tris(N,N-diethylaminooxy)-12,12-dimethyl-1,12-disilatridecane.

EXAMPLE 9

Approximately 70 parts of 1,1,1,4,4-pentachloro-1,4-disilapentane in about 80 parts of dry heptane are reacted with about 230 parts of N,N-diethylhydroxylamine in about 60 parts of dry heptane for about 1 hour at reflux temperature. A precipitate is formed which is removed by filtration and identified as N,N-diethylhydroxylamine hydrochloride. The heptane solvent and excess N,N-diethylhydroxylamine are removed in vacuo and a residual product is recovered which is identified as 1,1,1,4,4-pentakis(N,N-diethylaminooxy)-1,4-disilapentane.

EXAMPLE 10

In accordance with the procedure described in Example 9, approximately 650 parts of N,N-dioctylhydroxylamine dissolved in about 400 parts of dry heptane are added to a reactor containing about 98 parts of 1,1,1,12,12-pentachloro-1,12-disilatridecane dissolved in about 100 parts of dry heptane. A residual product is recovered which is identified as 1,1,1,12,12-pentakis(N,N-dioctylaminooxy)-1,12-disilatridecane.

EXAMPLE 11

In accordance with the procedure described in Example 9, about 300 parts of N-butyl-N-ethylhydroxylamine dissolved in about 200 parts of dry heptane are added to a reactor containing about 83 parts of 1,1,1,8,8-pentachloro-1,8-disilanonane in about 100 parts of dry heptane. a residual product is covered which is identified as 1,1,1,8,8-pentakis(N-butyl-N-ethylaminooxy)-1,8-disilanonane.

EXAMPLE 12

To a reactor containing about 50 parts of 1,1,1,4,4-pentachloro-1,4-disilapentane in about 500 parts of toluene are added about 105 parts of acetic anhydride with agitation over a period of 30 minutes. The reaction mass is refluxed for about 45 minutes and the volatile materials removed in vacuo. A product is recovered which is identified as 1,1,1,4,4-pentaacetoxy-1,4-disilapentane by chemical analysis.

EXAMPLE 13

In accordance with the procedure described in Example 12, approximately 172 parts of decanoic acid are reacted with about 70 parts of 1,1,1,12,12-pentachloro-1,12-disilatridecane. A residual product is recovered which is identified as 1,1,1,12,12-pentadecanoyloxy-1,12-disilatridecane.

EXAMPLE 14

In accordance with the procedure described in Example 12, approximately 116 parts of hexanoic acid are reacted with about 60 parts of 1,1,1,8,8-pentachloro-1,8-disilanonane. A residual product is recovered which is identified by chemical analysis as 1,1,1,8,8-hexanoyloxy-1,8-disilanonane.

EXAMPLE 15

Approximately 154 parts of diethylhydrogenphosphate are added to about 500 parts of benzene and introduced into a reactor containing 50 parts of 1,1,1,4,4-pentachloro-1,4-disilapentane in about 250 parts of benzene. The reactants are heated to reflux temperature for about 0.5 hours with agitation. Nitrogen is then passed through the solution for approximately 4 hours and the solvent and volatile materials are removed under vacuum distillation. A residual product is recovered which is identified as 1,1,1,4,4-pentakis(diethylphosphato)-1,4-disilapentane.

EXAMPLE 16

Approximately 120 parts of dimethylhydrogenphosphate in about 400 parts of benzene are introduced to a reactor containing about 70 parts of 1,1,1,12,12-pentachloro-1,12-disilatridecane dissolved in about 300 parts of benzene. The reactants are heated to reflux temperature for about 1 hour with agitation. Nitrogen is then passed through the solution for approximately 5 hours and the solvent and volatile materials removed under vacuum distillation. A residual product is recovered with is identified as 1,1,1,12,12-pentakis(dimethylphosphato)-1,12-disilatridecane.

EXAMPLE 17

In accordance with the procedure described in Example 16, approximately 38 parts of dimethylhydrogenphosphate are reacted with about 24 parts of 1,1,1-trichloro-4,4-dimethyl-1,4-disilapentane. A residual product is recovered which is identified as 1,1,1-tris(dimethylphosphato)-4,4-dimethyl-1,4-disilapentane.

EXAMPLE 18

In accordance with the procedure described in Example 16, approximately 250 parts of diphenylhydrogenphosphate are reacted with about 60 parts of 1,1,1,8,8-pentachloro-1,8-disilanonane. A residual product is recovered which is identified as 1,1,1,8,8,-pentakis(diphenylphosphato)-1,8-disilanonane.

EXAMPLE 19

To a reactor containing about 66 parts of 2,2,5,5-tetra-chloro-2,5-disilahexane dissolved in about 150 parts of benzene are added about 190 parts of N,N-diethylhydroxylamine dissolved in about 150 parts of benzene and heated to reflux temperature for about 1 hour. A precipitate is formed which is removed by filtration and identified as N,N-diethylhydroxylamine hydrochloried. The solvent and excess N,N-diethylhydroxylamine are removed in vacuo yielding a residual product which is identified as 2,2,5,5-tetrakis(N,N-diethylaminooxy)-2,5-disilahexane.

EXAMPLE 20

In accordance with the procedure described in Example 19, approximately 70 parts of 2,2,7,7-tetrachloro-2,7-disilaoctane in about 250 parts of benzene are reacted with about 550 parts of N,N-dioctylhydroxylamine in about 400 parts of benzene. A residual product is recovered which is identified as 2,2,7,7-tetrakis(N,N-dioctylaminooxy)-2,7-disilaoctane.

EXAMPLE 21

In accordance with the procedure described in Example 19, 85 parts of 2,2,11,11-tetrachloro-2,11-disiladodecane are reacted with about 250 parts of N-butyl-N-ethylhydroxylamine. A residual product is recovered which is identified as 2,2,11,11,-tetrakis-(N-butyl-N-ethylaminooxy)-2,11-disiladodecane.

EXAMPLE 22

To a reactor equipped with a mechanical stirrer, reflux condenser, nitrogen outlet and addition funnel are added about 110 parts of acetic anhydride dissolved in about 150 parts of toluene and about 60 parts of 2,2,5,5-tetrachloro-2,5-disilahexane dissolved in about 500 parts of toluene. The reaction mass is refluxed for a period of about 2 hours and the volatile materials are removed under vacuum yielding a product identified as 2,2,5,5-tetraacetoxy-2,5-disilahexane.

EXAMPLE 23

In accordance with the procedure described in Example 22, about 180 parts of decanoic acid dissolved in benzene are added dropwise to a reactor containing about 70 parts of 2,2,7,7-tetrachloro-2,7-disilaoctane. A residual reaction product is recovered which is identified as 2,2,7,7-tetradecanoyloxy-2,7-disilaoctane.

EXAMPLE 24

In accordance with the procedure described in Example 22, approximately 120 parts of acetic anhydride dissolved in about 150 parts of ethyl ether are added to a reactor containing about 80 parts of 2,2,11,11-tetrachloro-2,11-disiladodecane dissolved in about 1,100 parts of toluene. A residual product is recovered which is identified as 2,2,11,11-tetraacetoxy-2,11-disiladodecane.

EXAMPLE 25

To a reactor containing approximately 31 parts of hydroxyl-terminated organopolysiloxane having a viscosity of about 10,000 cs. are added about 3 parts of the cross-linking agent prepared in accordance with the procedure described in Example 1. The reactants are heated to a temperature of about 80° C. for about 1 hour with agitation. The volatile materials are removed under vacuum and the residual product is transferred to a mold and allowed to cure at room temperature. The product cured to a tack-free condition in about 1.5 hours.

EXAMPLES 26 TO 35

In accordance with the procedure described in Example 25, organopolysiloxanes are reacted with various cross-linking agents and cured at room temperature in ambient moisture. The compositions cured to a tack-free condition in a period of time ranging from about 0.4 to about 6 hours. In some of the following examples, fillers are added to improve the physical properties. The results of these experiments are illustrated in Table I.

TABLE I

| Example No. | Cross-linking agent ex. no. | parts | OH-Polydimethylsiloxane parts | viscosity cs. | Catalyst type | parts |
|---|---|---|---|---|---|---|
| 26 | 3 | 3.2 | 30 | 2000 | — | — |
| 27 | 9 | 3.0 | 30 | 400 | — | — |
| 28 | 11 | 3.0 | 30 | 2000 | DBTC | 0.5 |
| 29 | 14 | 3.0 | 30 | 4000 | DBTD | 0.5 |
| 30 | 15 | 3.0 | 29 | 700 | — | — |
| 31 | 16 | 4.0 | 32 | 700 | — | — |
| 32 | 17 | 4.5 | 32 | 700 | DBTD | 0.5 |
| 33 | 21 | 5.1 | 33 | 1000 | — | — |
| 34 | 22 | 5.4 | 35 | 1000 | — | — |
| 35 | 23 | 3.8 | 28 | 1000 | — | — |

DBTC = dibutyltin butoxychloride
DBTD = dibutyltin dilaurate

EXAMPLE 36

A primer composition consisting of 90 parts of 1,1,1,4,4-pentaacetoxy-1,4-disilapentane dissolved in 10 parts of methylene chloride is applied to a previously cleaned and degreased stainless steel substrate. The primer is allowed to dry for approximately 3 hours at ambient moisture.

A room temperature curing silicone rubber composition consisting of about 100 parts of a hydroxyl-terminated polydimethylsiloxane fluid having a viscosity of 7,000 cs., 20 parts of Cab-O-Sil, 10 parts of 1,1,1,4,4-pentaacetoxy-1,4-disilapentane and 1.0 part of dibutyltin dilaurate is poured on the primed substrate. The silicone rubber is allowed to set up, after which the bond is tested by trying to peel the rubber from the metal substrate with a spatula. The adhesion is good as illustrated by the fact that only cohesive failure in the cured rubber is found.

In accordance with the procedure described above, a grafted organopolysiloxane prepared in accordance with Example 31 (a) is substituted for the polydimethylsiloxane fluid above. The adhesion is good as illustrated by the fact that only cohesive failure in the rubber is found.

In a controlled test, the silicone rubber is applied to an unprimed metal substrate. The rubber peeled cleanly off the metal with little effort.

When the above examples are repeated utilizing other disilaorganic compounds with hydroxyl-terminated organopolysiloxanes, the elastomeric materials are obtained which have properties substantially equivalent to those of the specified examples.

Although specific examples of the invention have been described herein, other variations and modifications falling within the spirit and scope of the appended claims are to be included therein.

The invention claimed is:

1. A composition curable to an elastomeric solid when exposed to atmospheric moisture at room temperature comprising an organopolysiloxane of the formula:

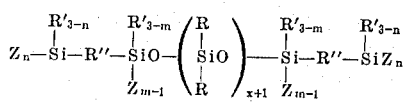

in which R is selected from the group consisting of alkyl radicals having from one to 18 carbon atoms, aryl radicals, alkaryl radicals, aralkyl radicals, haloaryl radicals and alkenyl radicals; R' is selected from the group consisting of hydrogen, monovalent hydrocarbon radicals, halogenated monovalent hydrocarbon radicals and cyanoalkyl radicals; R'' is selected from the group consisting of divalent hydrocarbon radicals and halogenated divalent hydrocarbon radicals having from two to 18 carbon atoms; Z is a hydrolyzable group selected from the class consisting of acyloxy, aminooxy, amino and phosphato radicals; $m$ is a number of at least 1 and up to 3; $n$ is a number of from 0 to 3; the sum of $m$ and $n$ in each terminal disilaorganic group is greater than 2 and up 6; when Z is an acyloxy radical, $m$ is equal to at least 2 and $n$ is equal to at least 1 and when Z is an aminooxy radical, and $m$ is equal to at least 1 then $n$ is greater than 2; and when $n$ is zero, then $m$ is greater than 2 and $x$ is a number of from 0 to 20,000.

2. The composition of claim 1 which contains a tin salt of a carboxylic acid.

3. The composition of claim 1 wherein $m$ and $n$ are each equal to 2.

4. A composition curable to an elastomeric solid when exposed to atmospheric moisture at room temperature comprising an organopolysiloxane of the formula:

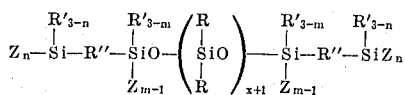

in which R is selected from the group consisting of alkyl radicals having from one to 18 carbon atoms, aryl radicals, alkaryl radicals, aralkyl radicals, haloaryl radicals and alkenyl radicals; R' is selected from the group consisting of hydrogen, monovalent hydrocarbon radicals, halogenated monovalent hydrocarbon radicals and cyanoalkyl radicals; R'' is selected from the class consisting of divalent hydrocarbon radicals and halogenated divalent hydrocarbon radicals having from two to 18 carbon atoms; Z is a phosphato radical; $m$ is a number of at least 1 and up to 3; $n$ is a number of from 0 to 3; the sum of $m$ and $n$ in each terminal disilaorganic group is greater than 2 and up to 6 and $x$ is a number of from 0 to 20,000.

5. A composition curable to an elastomeric solid when exposed to atmospheric moisture at room temperature comprising an organopolysiloxane of the formula:

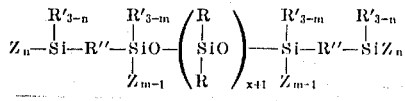

in which R is selected from the group consisting of alkyl radicals having from one to 18 carbon atoms, aryl radicals, alkaryl radicals, aralkyl radicals, haloaryl radicals and alkenyl radicals; R' is selected from the group consisting of hydrogen, monovalent hydrocarbon radicals, halogenated monovalent hydrocarbon radicals and cyanoalkyl radicals; R'' is selected from the group consisting of divalent hydrocarbon radicals and halogenated divalent hydrocarbon radicals having from two to 18 carbon atoms; Z is an aminooxy radical; each $m$ is equal to 1; each $n$ is equal to 3 and $x$ is a number of from 0 to 20,000.

* * * * *